Aug. 20, 1963     S. LEES     3,101,003
POLAR ACCELEROMETER
Filed Jan. 25, 1960     2 Sheets-Sheet 1
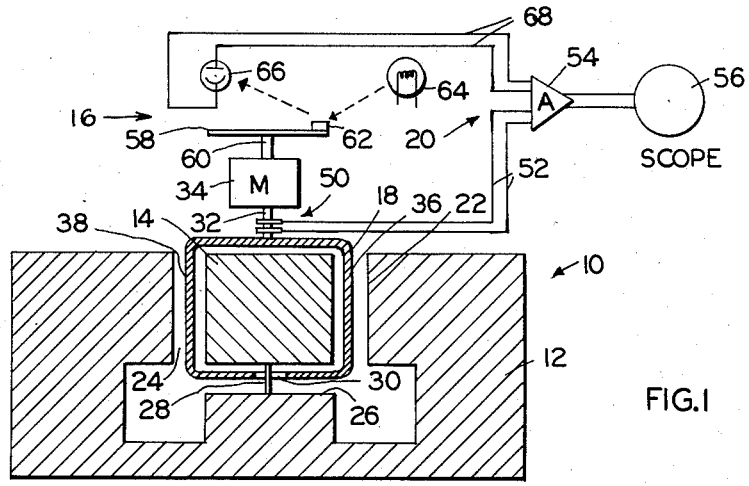
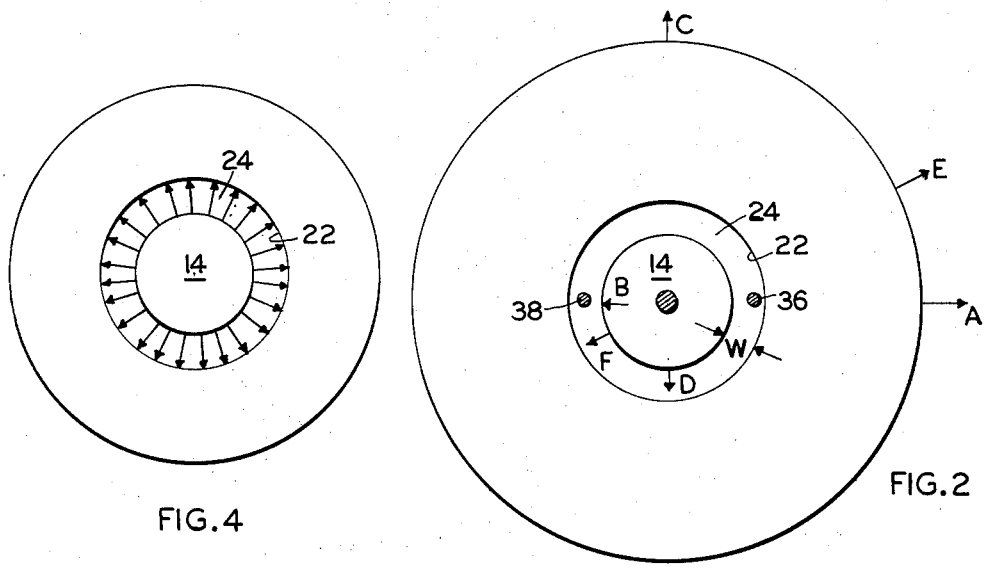
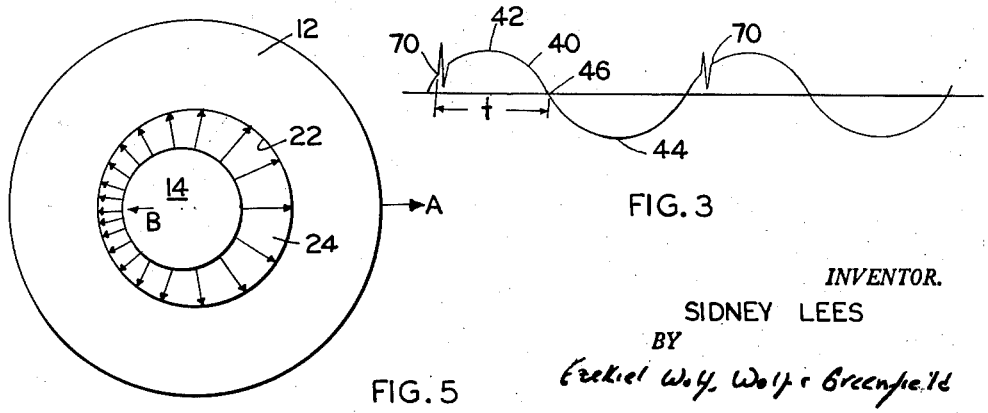
INVENTOR.
SIDNEY LEES
BY
Ezekiel Wolf, Wolf & Greenfield
ATTORNEYS

United States Patent Office 3,101,003
Patented Aug. 20, 1963

3,101,003
POLAR ACCELEROMETER
Sidney Lees, 544 Walnut St., Newton, Mass.
Filed Jan. 25, 1960, Ser. No. 4,497
11 Claims. (Cl. 73—517)

This invention relates to accelerometers and more particularly comprises a new and improved linear accelerometer capable of measuring accelerations in any direction parallel to the plane in which the instrument is oriented.

In the prior art devices of which I am aware, linear accelerometers are unidirectional, that is, they are capable of measuring acceleration in but one direction determined by the orientation of the instrument. In order to measure accelerations in different directions, it has been necessary to employ two independently operated output indicators, each unidirectional, and utilize the two indicators to obtain vector components of the acceleration along the $x$ and $y$ coordinates. Thereafter the information obtained by each indicator has been combined to determine the magnitude and direction of the acceleration.

The primary object of my invention is to provide a linear accelerometer capable of measuring directly accelerations in any direction and indicate not only the magnitude of the acceleration but its direction as well.

To accomplish this and other objects, one embodiment of my invention includes a magnetic circuit composed of a cylindrical armature and a surrounding magnetic field piece. The magnetic field piece includes an annular pole piece having a pole face cylindrical in shape which surrounds the armature and is spaced a uniform distance from it to define an annular gap in the circuit of uniform width throughout its length. The second pole face of the field piece is aligned with one end of the armature and is also spaced from it. The armature is yieldably restrained in a reference position by a supporting flexible reed extending upwardly from the second pole face of the field piece, and the reed permits the armature to swing in any direction substantially in a plane perpendicular to the cylindrical pole face. When the field piece accelerates in any direction in the plane of or in a plane parallel to the cylindrical pole face, the armature deflects on its flexible support in a direction opposite to that of the acceleration. This deflection of the armature relative to the annular pole piece will upset the formerly uniform width of the gap about the annulus to change the reluctance of the magnetic circuit.

Disposed in the annular gap between the armature and the surrounding pole face is a coil oriented in a plane which includes the axis of the armature and field piece. The field piece may either be a permanent magnet or an electromagnet and will provide a source of magnetic flux which fills the annular gap. A motor is provided to rotate the coil about the axis of the armature causing the coil to cut the lines of flux radiating between the armature and the magnetic field piece. When the gap width is constant throughout the annulus, no signal is induced in the coil as it rotates but when the armature displaces to upset the uniformity of the gap width, a signal is induced in the coil, which is sinusoidal in nature with one cycle for each complete coil revolution. The amplitude of the signal is a measure of the maximum flux density which in turn is a measure of the displacement of the armature from the reference position wherein the gap is uniform. As the displacement of the armature is a function of the acceleration, it will be appreciated that the amplitude of the signal is a measure of the acceleration.

To determine the direction of acceleration, numerous means may be provided to establish a reference position for the coil. By providing a reference signal each time the coil assumes a particular angular position, the direction of the displacement of the armature may be established.

In a second embodiment of my invention the armature is replaced by a non-conducting cylindrical bobbin having a metallic cylindrical skin which forms one plate of a capacitor. The bobbin like the armature is elastically restrained in a reference position and displaces in response to acceleration of its support. A pair of electrodes disposed parallel to the axis of the bobbin are spaced from its metallic skin and form the second plate of the capacitor. The electrodes are displaced 180° apart about the bobbin axis and rotate about a fixed axis coincident with the axis of the bobbin in its reference position. A potential is impressed across the condenser plates and the capacitance may be measured by a circuit identical to that used in the other embodiment of my invention. The capacitance will of course vary in response to displacement of the bobbin which effects a change of gap width between the plates. The direction of displacement may also be readily determined in the same manner as employed in the preferred embodiment of my invention.

These and other objects and features of my invention will be better understood and appreciated from the following detailed description of two embodiments thereof, selected for purposes of illustration and shown in the accompanying drawing, in which:

FIGURE 1 is a cross sectional elevation view of the preferred embodiment of an accelerometer constructed in accordance with my invention;

FIGURE 2 is a plan view of a portion of the accelerometer shown in FIGURE 1;

FIGURE 3 is a curve suggesting the output signal of the accelerometer shown in FIGURE 1;

FIGURES 4 and 5 are diagrammatic views of the device shown in FIGURES 1 and 2 illustrating the effect of displacement of the armature upon the flux density in the gap;

Figure 6:
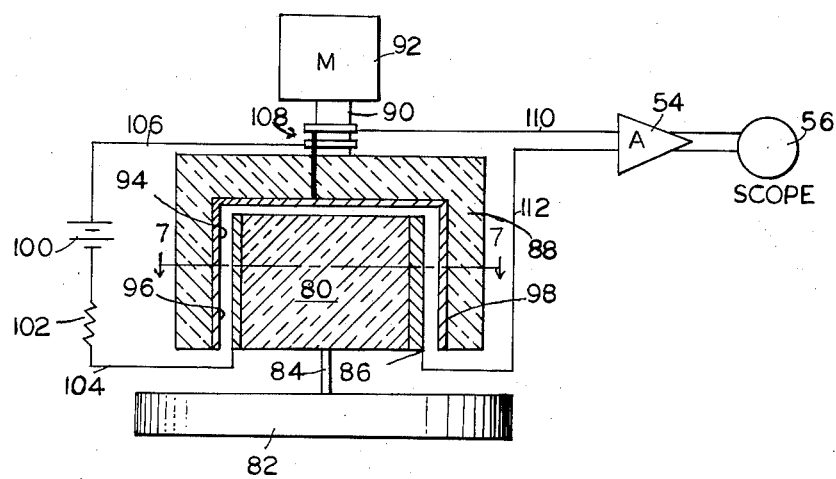
FIGURE 6 is a cross-sectional elevation view of another embodiment of my invention.

The accelerometer shown in the drawing includes in its general organization a magnetic circuit 10 composed of a field piece 12 and an armature 14, and a measuring system 16 which includes a coil 18 and an electromechanical indicating device 20.

The field piece 12 of the magnetic circuit 10 may either be a permanent or electromagnet, is generally E-shaped in cross section as shown in FIGURE 1, and includes a pole face 22 which surrounds the armature 14. The gap 24 between the cylindrical surface of the armature 14 and the pole face 22 is uniform in width as is shown clearly in FIGURE 2. The field piece 12 includes a second pole face 26 aligned axially with the armature 14 and spaced below the bottom end of the armature.

A flexible reed 28 secured to the pole face 26 extends upwardly and supports the armature 14 in a reference position wherein its axis is concentric with the pole face 22. Thus, the gap 24 has a constant width $w$ and describes an annulus between the armature and pole face 22. Because the reed 28 is flexible, the armature 14 has complete freedom of movement about 360° in a plane substantially perpendicular to the pole face 22 and the armature axis. Thus, if the field piece 12 is accelerated in the direction of arrow A (see FIGURE 2), the armature 14 will deflect in the direction of arrow B toward the pole face 22. Similarly, acceleration of the field piece 12 in the direction of arrow C will cause the armature 14 to deflect in the direction of arrow D, and acceleration in the direction E will cause the armature to deflect in the direction of arrow F. In each example it will be noted that the displacement of the armature is in the direction opposite to that of the acceleration to which the field piece is subjected.

When the armature 14 is in the reference position into which it is biased by the reed 28, the flux density about the gap 24 is uniform, as suggested in FIGURE 4, wherein the flux lines are shown to be uniformly spaced and radiating outwardly from the armature in the direction of pole face 22. However, when the armature 14 displaces towards one portion of the pole face 22, the flux density about the annular gap 24 is no longer uniform. Attention is directed to FIGURE 5 wherein the flux density suggested by the arrows in the gap 24 are most closely spaced at the location of arrow B representing the direction in which the armature 14 displaced within the cylindrical pole face 22 in response to acceleration of the field piece 12 in the direction of arrow A.

Referring again to FIGURES 1 and 2, the reader will note that the coil 18 forming part of the measuring system 16 is oriented in a vertical plane which includes the axis of the armature 14 and the pole face 22. The coil 18 extends about the armature 14 and is provided with an opening 30 so as to avoid contact with the reed 28. The coil which may be made up of several turns of electrical conducting material is supported on the shaft 32 of motor 34. The motor rotates the coil 18 about the axis of the armature 14 so that the vertical legs 36 and 38 of the coil cut the lines of flux which extend across the gap 24 between the armature and pole face 22. It will be recognized that when the flux density in the gap 24 is constant as in the case shown in FIGURE 4, rotation of the coil 18 in the gap will not induce a current in the coil. However, when the armature displaces as suggested in FIGURE 5 to produce a non-uniform flux density in the gap 24, a signal will be induced in the coil 18, sinusoidal in nature, as suggested in FIGURE 3. The curve 40 which represents the signal induced in the coil 18 will have a maximum amplitude as indicated at 42 when one of the legs 36 or 38 of the coil passes through the point of maximum flux density adjacent arrow B. The maximum negative amplitude 44 of the signal 40 will occur when the other of the legs 36 and 38 pass through that point of maximum flux density. The signal induced in the coil will have a zero value 46 when the density of the flux cut by the two legs of the coil is equal. Thus, when the coil lies in a plane normal to the arrows A and B, the signal is of zero value. Because the flux density at any point in the gap 24 is proportional to the width of the gap between the armature 14 and the pole face 22 at that point, and further because the width of the gap is proportional to the acceleration to which the field piece 12 is subjected, the amplitude of the signal induced in the coil is proportional to and, thus, is a measure of that acceleration.

The amplitude of the signal induced in the coil 18 may be measured in any one of several ways. In FIGURE 1, I have suggested that the signal induced in the coil 18 may be fed by means of the slip ring assembly 50 and conductors 52 through amplifier 54 to oscilloscope 56. By means of the scope 56, the amplitude of the signal may be measured.

The measuring system is completed by the means provided to determine the direction of the acceleration. In the embodiment illustrated, the motor 34 carries a flat plate 58 on the upper end of its upwardly extending shaft 60 and the plate 58 rotates in synchronism with the coil 18. The plate 58 carries a reflector 62 at one point on its periphery. The location of the reflector 62 serves to establish a reference position for the coil 18. In FIGURE 1, the reflector is positioned to reflect the light emanating from the light source 64 to the photocell 66. The signal generated by the photocell is conveyed by leads 68 to the amplifier 54 and that signal may be superimposed on the signal induced in the coil 18 as a pulse of pip 70 as suggested in FIGURE 3. Thus, by measuring the time $t$ the pip 70 and the null point 46 on curve 40 the direction of the acceleration may be determined. It will of course be appreciated that the null point 46 is displaced 90° from the point 42 of maximum signal amplitude.

Although I have described in detail one means for determining the direction of the acceleration, it will be recognized that numerous other means may be employed to accomplish the same purpose. For example, once each revolution, the coil 18 could be shorted out across the slip ring assembly 50 which would produce a single pip on each cycle of the curve 40. This method would establish a reference position for the coil and by measuring the time $t$ between the pip created by the short and the null position on the curve, the direction of acceleration may be determined. While I have also suggested that the signal may be measured by means of a scope 56, it will be appreciated that the amplitude of the signal may be measured in other ways by conventional equipment.

Figure 7:
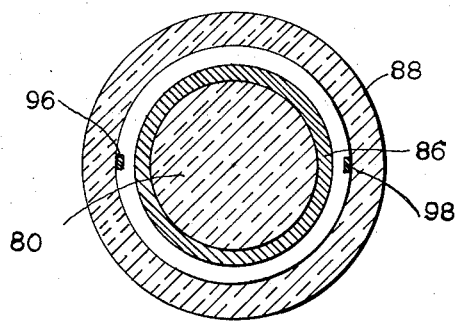
FIGURE 7 is a cross-sectional view taken along the section line 7—7 in FIGURE 6.

While in the preferred embodiment of my invention the acceleration is measured by sensing the changes in reluctance of the magnetic circuit, in the embodiment of FIGURES 6 and 7 this measurment is made by sensing the change in capacitance in an electrical circuit. In FIGURE 6, a cylindrical bobbin 80 made of a non-conductive material such as ceramic is yieldably supported in a reference position above a support 82 by a flexible reed 84. The bobbin has a metallic skin 86 about its side wall and is surrounded by a second cylinder 88 also made of a non-conductive material. The cylinder 88 is carried on the shaft 90 of motor 92 and is caused to rotate by that motor about an axis coincident with the bobbin axis in the reference position illustrated.

A U-shaped electrode 94 may be painted with a conductive material or similarly secured to the inner surface of the cylinder 88 so as to provide a pair of arms 96 and 98 displaced 180° apart and spaced equal distances from the skin 86 of the bobbin 80. The electrode 94 and the skin 86 form the plates of a capacitor and are separated by an air gap which is uniform as the cylinder 88 rotates, so long as the bobbin remains in the reference position.

The capacitor formed by the electrode 94 and the skin 86 is connected across a battery 100 and in series with resistor 102 by means of leads 104 and 106 and slip ring assembly 108. If the resistor 102 has a large value, the voltage across the capacitor will be proportional to the gap width between the plates, i.e. between the skin and the electrode arms 96 and 98. As long as the bobbin remains in its reference position, the capacitance remains the same and the voltage across the capacitor remains constant. However, when the bobbin displaces in response to acceleration of the instrument, the gap width between the skin 86 and the electrodes will vary as the cylinder 88 rotates about its axis. Thus, the signal across the capacitor will be sinusoidal in nature, taking the form of curve 40 in FIGURE 5. This signal may be amplified and directed to the scope 56 by means of leads 110 and 112, slip ring assembly 108 and amplifier 54. As the width of the gap is proportional to the acceleration of the instrument and the amplitude of the signal is proportional to the gap width at its smallest point, the amplitude of the signal is proportional to the acceleration.

The direction of displacement of the bobbin may be determined in any one of several ways. For example, the electromechanical means disclosed in FIGURE 1 could be added to the structure of FIGURE 6 and accomplish the same function. Alternatively, once each revolution of the cylinder 88 the plates of the capacitor could be instantaneously shorted to establish a reference position for the cylinder 88 and impose a pulse on the sinusoidal signal. By measuring the time between the pulse and the point of maximum amplitude of the curve on the scope, the direction of acceleration may be determined.

Because numerous modifications may be made of my invention as suggested above without departing from its spirit, it is not my intention to limit the breadth of my invention to the specific embodiments illustrated and described. Rather, it is my intention that the breadth of my invention be determined by the appended claims and their equivalents.

What I claim as new and desire to secure by Letters Patent of the United States is:

1. A polar accelerometer comprising a magnetic field piece having an annular first pole piece and a second pole piece disposed on the axis of the first pole piece, a cylindrical armature surrounded by the first pole piece and defining with the field piece a magnetic circuit, the diameter of the armature being smaller than the inner diameter of the annular pole piece to form an annular gap in said circuit, a flexible reed yieldably supporting said armature coaxially with the pole piece and providing said armature with freedom of movement substantially in the plane of the pole piece to vary the radial width of the gap about the annulus, said armature moving in said plane in response to acceleration of the field piece, a coil disposed in the plane of the axis of the poles and in part disposed in the gap, means for rotating the coil about said axis causing the flux in the gap to induce an alternating signal in the coil when the density in the gap is non-uniform, means for measuring the amplitude of the signal, and means for imposing on said signal a second signal establishing a reference position for said coil during each revolution.

2. A polar accelerometer comprising a cylindrical armature, a magnetic field piece including an annular pole piece surrounding and spaced from the armature, a second pole piece forming part of the field piece and spaced from one end of the armature, said field piece and armature together forming a magnetic circuit with a uniform flux density in the gap between the armature and annular pole piece, means supporting said armature in said circuit and enabling said armature to move in the plane of the first pole piece to vary the flux density about the gap, a coil rotatably mounted in the gap for rotation about the axis of the annular pole piece, said coil carrying an induced alternating signal whose amplitude is proportional to the displacement of the armature in the gap, and means for measuring the amplitude of the signal.

3. In a polar accelerometer, a magnetic circuit having an armature, surrounding magnetic field piece, and an annular gap between the armature and field piece; means enabling said armature to displace in response to acceleration of said accelerometer radially within the field piece in a direction opposite to the direction of acceleration to vary the flux density in the gap, a conductor disposed in the gap, means moving said conductor about the annular gap causing it to cut the lines of flux established in the gap, and means for measuring the signal induced in said conductor by the variations in flux density in the gap effected by movement of the armature.

4. A polar accelerometer comprising, a magnetic circuit including an armature and an adjacent pole piece spaced apart to define a gap having a uniform flux density, a flexible support for the armature enabling said armature to move in response to acceleration of the accelerometer toward the pole piece at a location indicative of the direction of the acceleration to establish a non-uniform flux density in the gap, and means including a conductor moving through the gap and cutting the lines of flux in the gap and establishing a signal whose value is a function of the flux density at each point in the gap.

5. In a polar accelerometer, a magnetic circuit including an armature and a pole piece defining a gap of constant width throughout its length, a flexible support for the armature enabling said armature to move in response to its acceleration toward the pole piece at a location indicative of the direction of acceleration and effect variations in the width along the length of the gap, a conductor moving through the length of said gap and establishing a signal which is a function of the variations in gap width, and means for measuring the magnitude of the signal.

6. In an accelerometer, a magnetic circuit including a circular armature and surrounding annular pole piece spaced from the armature and defining a gap between them, means yieldably supporting the armature in a reference position wherein said gap width is uniform, said means enabling said armature to displace radially relative to said pole piece in response to acceleration of the armature to vary the gap width, said radial movement being in a direction opposite to the direction of acceleration of the armature, a conductor movable in the annular gap about the axis of the piece and establishing a signal which is a function of the width of the gap, and means for measuring said signal.

7. A polar accelerometer comprising a magnetic circuit including an armature and an adjacent pole piece spaced apart to define a gap having a uniform flux density, means yieldably supporting said armature enabling said armature to move in response to its acceleration toward the pole piece to increase the flux density in the gap at a location indicative of the direction of the acceleration, and means including a conductor cyclically movable through the gap and cutting the lines of flux in the gap for establishing a signal whose maximum amplitude is a function of the flux density at said location, and means for establishing a reference position for the conductor in the gap as it moves through each cycle.

8. Acceleration sensitve apparatus comprising, an element supported on a body whose acceleration is to be sensed, said element being normally oriented relative to said body in a reference position when the velocity of said body is constant, means for supporting said element to prevent relative movement between said element and said body along a first line of direction while allowing relative movement in the plane orthogonal to said first line of direction, means including said element for establishing a field external to said element, field sensitive means relatively movable with respect to said element and responsive to relative periodic motion between said element and said field sensitive means for providing a periodic electrical signal representative of said acceleration when said elment is displaced from said reference position, and means responsive to said field sensitive means and said element assuming a predetermined reference relative position for providing a periodic reference signal, the time displacement between said reference signal and said periodic signal being characteristic of the direction of said acceleration.

9. Acceleration sensitive apparatus in accordance with claim 8 and further comprising, means for comparing said reference signal with said periodic signal to derive an indication of said acceleration direction, and means responsive to the amplitude of said periodic electrical signal from said field sensitive means for providing an indication of the magnitude of said acceleration.

10. In a polar accelerometer, field establishing means including an armature and another member defining a gap of predetermined width throughout its length, a flexible support for the armature enabling said armature to move in response to acceleration of the accelerometer toward said another member to effect variation in the width along the length of the gap, said flexible support returning said armature to a predetermined reference position in the absence of acceleration, means responsive to the field established in said gap for providing a signal which is a function of said variations in gap width, and means for measuring the magnitude of the latter signal.

11. Apparatus in accordance with claim 10 wherein said armature and said another member define an annular gap of substantially constant width throughout its circumferential length when said armature resides in said reference position, and means for supporting said armature relative to said another member to prevent relative movement between said armature and said another member in a direction generally parallel to the axis of said annular gap while allowing relative movement therebetween in a plane orthogonal to said axis.

References Cited in the file of this patent

UNITED STATES PATENTS

| | | |
|---|---|---|
| 2,381,645 | Carlstein | Aug. 7, 1945 |
| 2,613,071 | Hansel | Oct. 7, 1952 |
| 2,638,556 | Hausz | May 12, 1953 |
| 2,726,074 | Ketchledge | Dec. 6, 1955 |
| 2,805,677 | Baird | Sept. 10, 1957 |
| 2,925,590 | Boltinghouse | Feb. 16, 1960 |
| 2,928,667 | Peterson | Mar. 15, 1960 |

FOREIGN PATENTS

| | | |
|---|---|---|
| 759,585 | Great Britain | Oct. 24, 1956 |
| 791,827 | Great Britain | Mar. 12, 1958 |